(12) United States Patent
Guwaifli et al.

(10) Patent No.: US 12,275,541 B2
(45) Date of Patent: Apr. 15, 2025

(54) MAGNETIC DRONE

(71) Applicant: SAUDI ARABIAN OIL COMPANY, Dhahran (SA)

(72) Inventors: Abdullah M. Guwaifli, Dhahran (SA); Sultan A. Shaqaq, Al Ahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 75 days.

(21) Appl. No.: 18/174,500

(22) Filed: Feb. 24, 2023

(65) Prior Publication Data
US 2024/0286770 A1 Aug. 29, 2024

(51) Int. Cl.
*B64U 101/30* (2023.01)
*B64U 10/13* (2023.01)
*B64U 20/70* (2023.01)
*B64U 50/13* (2023.01)
*H01F 7/02* (2006.01)
*H01F 7/20* (2006.01)
*B64U 20/30* (2023.01)
*B64U 101/26* (2023.01)

(52) U.S. Cl.
CPC ............. *B64U 10/13* (2023.01); *B64U 20/70* (2023.01); *B64U 50/13* (2023.01); *H01F 7/02* (2013.01); *H01F 7/20* (2013.01); *B64U 20/30* (2023.01); *B64U 2101/26* (2023.01); *B64U 2101/30* (2023.01)

(58) Field of Classification Search
CPC ........ B64U 10/13; B64U 20/70; B64U 20/30; B64U 2101/30; B64U 2101/26; B64U 50/13; H01F 7/20; H01F 7/02
See application file for complete search history.

(56) References Cited

U.S. PATENT DOCUMENTS

| 8,167,234 B1* | 5/2012 | Moore ................... B64U 10/80 244/17.23 |
| 2014/0138477 A1* | 5/2014 | Keennon .............. G05D 1/0038 244/17.23 |
| 2016/0001875 A1* | 1/2016 | Daler ...................... B64C 17/00 244/17.11 |
| 2016/0280359 A1* | 9/2016 | Semke ................... B64U 60/60 |

(Continued)

FOREIGN PATENT DOCUMENTS

CN 106965924 A 7/2017
KR 20190114129 A 10/2019

OTHER PUBLICATIONS

International Search Report issued for corresponding international patent application No. PCT/US2024/016720, mailed Jun. 13, 2024 (6 pages).

(Continued)

*Primary Examiner* — Tye William Abell
(74) *Attorney, Agent, or Firm* — Osha Bergman Watanabe & Burton LLP

(57) ABSTRACT

In one aspect, a magnetic drone is disclosed. The magnetic drone includes a drone, a cage surrounding the drone, and one or more magnets disposed on the cage surrounding the drone. The drone includes a camera, a battery, one or more electric motors, and one or more propellers. In other aspects, a method to operate a magnetic drone and a non-transitory computer readable medium storing instructions for performing operation that flies a magnetic drone are also disclosed.

9 Claims, 5 Drawing Sheets

(56) References Cited

U.S. PATENT DOCUMENTS

| | | | | |
|---|---|---|---|---|
| 2016/0323751 | A1* | 11/2016 | Priest | H04W 64/003 |
| 2017/0291697 | A1* | 10/2017 | Kornatowski | B64C 39/024 |
| 2018/0079531 | A1* | 3/2018 | Bennett | B64C 39/024 |
| 2018/0237161 | A1* | 8/2018 | Minnick | B64F 1/007 |
| 2019/0009924 | A1 | 1/2019 | Neely | |
| 2019/0369057 | A1* | 12/2019 | Mattar | B64D 47/00 |
| 2020/0174478 | A1* | 6/2020 | Abdellatif | G08G 5/0013 |
| 2020/0218290 | A1* | 7/2020 | Gorsica | G01C 21/20 |
| 2021/0339845 | A1* | 11/2021 | Milan | B64U 30/299 |
| 2023/0034243 | A1* | 2/2023 | Ceborahs | B62D 57/024 |

OTHER PUBLICATIONS

Written Opinion issued for corresponding international patent application No. PCT/US2024/016720, mailed Jun. 13, 2024 (9 pages).

* cited by examiner

MAGNETIC DRONE

BACKGROUND

A drone is a useful device for monitoring oil and gas facilities because it can fly to a desired altitude, where human access may be difficult, in a short time. Using a drone for surveillance or inspection can still be costly and time consuming because using the drone is primarily limited by its battery life. During a surveillance or inspection operation, before the drone's complete discharge of its battery, the drone must return to its base to replace or charge its battery. Accordingly, increasing the operation time or operation distance of the drone with a single battery charge can save time, resources, and enhance asset surveillance for oil and gas facilities. In addition, current inspection applications use a drone to inspect high elevated ferrous assets, and the wind entering the ferrous assets may destabilize asset inspection. Accordingly, increasing the stability of the drone, during inspection, can increase inspection quality.

SUMMARY

This summary is provided to introduce a selection of concepts that are further described below in the detailed description. This summary is not intended to identify key or essential features of the claimed subject matter, nor it is intended to be used as an aid in limiting the scope of the claimed subject matter.

This disclosure presents, in accordance with one or more embodiments, a magnetic drone for inspection of oil and gas facilities. The magnetic drone includes: a drone that includes a camera, a battery, one or more electric motors, and one or more propellers; a cage surrounding the drone; and one or more magnets disposed on the cage surrounding the drone. The drone accordingly to one or more embodiments of the invention can increase inspection time, distance, and/or quality.

In another aspect, this disclosure also presents, in accordance with one or more embodiments, a method to operate a magnetic drone. The method includes: turning ON propellers of the magnetic drone to start deployment of the magnetic drone from a base to a target location; flying the magnetic drone, using the propellers of the magnetic drone, to the target location that includes a ferrous surface; contacting a magnet of the magnetic drone to the ferrous surface of the target location, so that the magnetic drone securely attaches to the ferrous surface; when the magnetic drone is securely attached to the ferrous surface of the target location, turning OFF the propellers of the magnetic drone; when the magnetic drone is securely attached to the ferrous surface of the target location, capturing images or videos via a camera of the magnetic drone; and turning ON the propellers of the magnetic drone to detach from the ferrous surface of the target location and fly the magnet drone back to the base.

In another aspect, this disclosure further presents, in accordance with one or more embodiments, a non-transitory computer readable medium (CRM) storing instructions for performing operation that flies a magnetic drone includes: turning ON propellers of the magnetic drone to start deployment of the magnetic drone from a base to a target location; flying the magnetic drone, using the propellers of the magnetic drone, to the target location that includes a ferrous surface; contacting a magnet of the magnetic drone to the ferrous surface of the target location, so that the magnetic drone securely attaches to the ferrous surface; when the magnetic drone is securely attached to the ferrous surface of the target location, turning OFF the propellers of the magnetic drone; when the magnetic drone is securely attached to the ferrous surface of the target location, capturing images or videos via a camera of the magnetic drone; and turning ON the propellers of the magnetic drone to detach from the ferrous surface of the target location and fly the magnet drone back to the base.

Other aspects and advantages of the invention will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the disclosure, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Drones are useful devices in oil and gas industry for inspection or surveillance of oil and gas assets. For example, an oil and gas asset may be a storage tank that stores hydrocarbons. An operator may have to fly a drone above the tank to monitor the level of the hydrocarbon inside the tank, the integrity of the tank, contamination, or any other aspect that requires inspection.

One or more embodiments of the invention provide a magnetic drone that can operate for a longer time than a conventional drone, and thereby can save time, resources, and enhance asset inspection for oil and gas facilities. The magnetic drone includes a drone, a cage surrounding the drone, and one or more magnets mounted on the cage surrounding the drone. In one or more embodiments, the cage may be similar to Elios 2. The cage not only protects the drone from accidental crashing, but also provides places on the outer surface of the cage for mounting magnets.

The number of the magnets mounted on the outer surface of the cage may be varied depending on a specific design or function of the magnetic drone. According to one or more embodiments, the number of the magnets mounted on the cage is determined such as to have sufficient coverage of the magnets on the cage while keeping the weight of the magnetic drone desirably low. Keeping the weight of the magnetic drone low helps with flying and maneuvering the magnetic drone.

Figure 1:
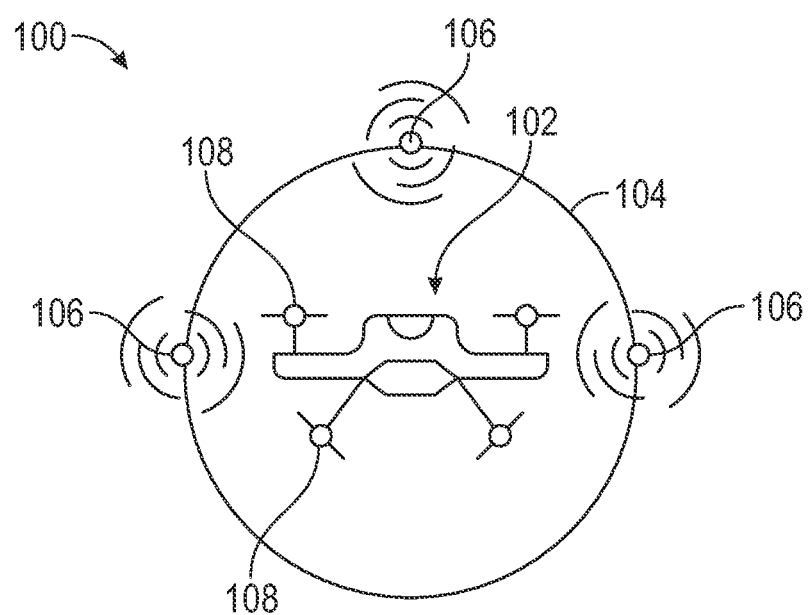
FIG. 1 shows a magnetic drone in accordance with one or more embodiments disclosed herein.

FIG. 1 shows a magnetic drone (100) according to one or more embodiments. The magnetic drone (100) includes a drone (102) and a cage (104) enclosing the drone (102). The cage (104) holds the drone (102), for example via strings that connect the cage (104) to the drone (102). In some embodiments, the drone maybe fastened to the cage via other means, such as glue. In one or more embodiments, the cage may have a sphere-like shape. For example, the cage may be similar to Elios 2, an indoor inspection drone model known to those with ordinary skill in the art. The shape and material of the cage may be determined based on the specific design or function of the magnetic drone. For example, the cage may be made of a polymer that provides sufficient structural integrity to protect the magnetic drone and that is light enough to not interfere with flying the drone. In other examples, the sphere-like shape may be a multifaceted shape such as tetrahedron, hexahedron, octahedron, dodecahedron, icosahedron, or a shape with even more facets.

The magnetic drone (100) further includes the magnets (106) that are mounted on the cage (104). The drone (102) includes a camera, a battery, a processor (e.g., a microprocessor), and propellers (108). The battery of the drone supplies electric motors that rotate the propellers (108), and the processor controls operation of the electric motors. In one or more embodiments, the battery may be a lithium battery.

The magnets (106) are attached to the cage (104) via a fastener. The fastener may be glue, clamp, or any other means that can hold the magnets (106) in place while the outer surfaces of the magnets can directly contact and magnetically attach to a ferrous surface.

Figure 4:
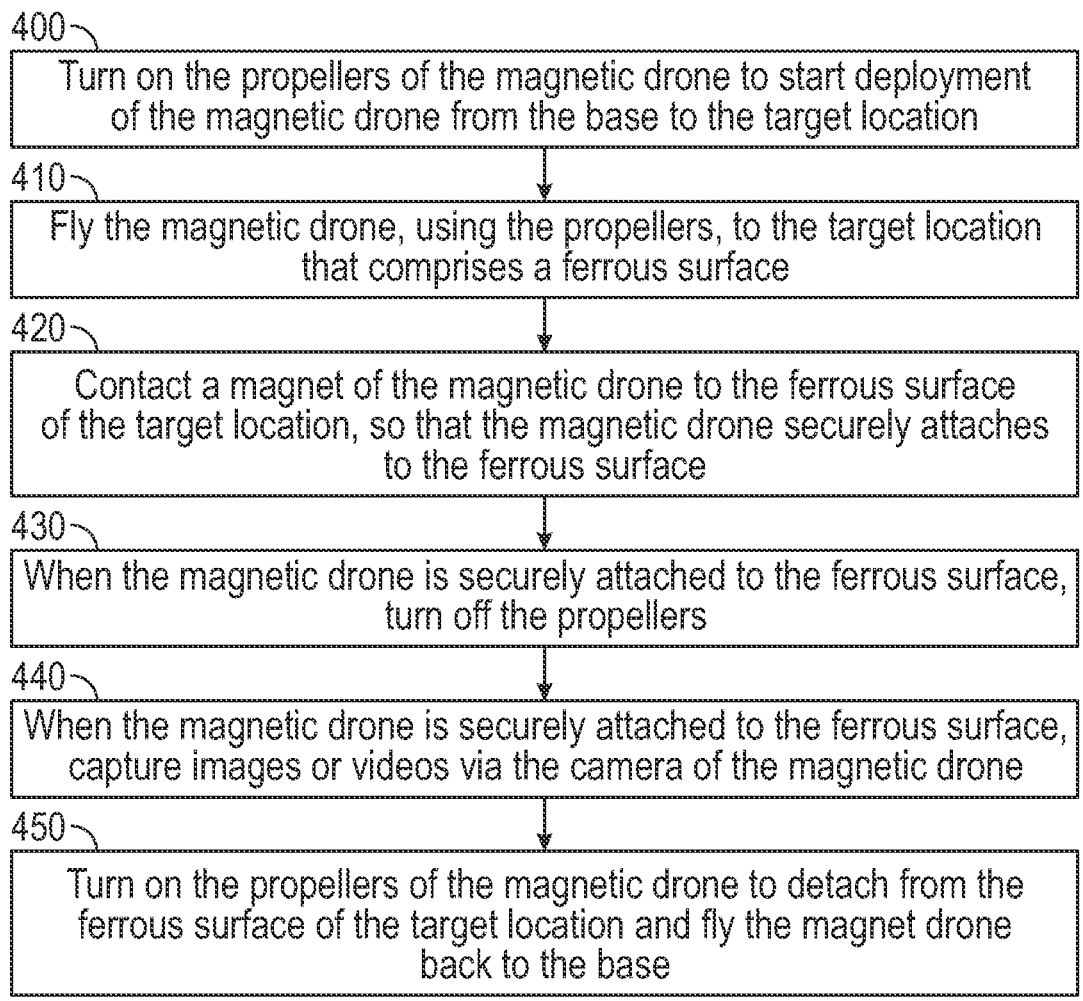
FIG. 4 shows a flowchart for a process of deploying and retracting a magnetic drone in accordance with one or more embodiments disclosed herein.

According to one or more embodiments, the magnets of the magnetic drone may be disposed on the cage such that there are more magnets in the top portion of the cage (e.g., top hemisphere of the sphere-like shape of the cage) than the bottom portion of the cage (e.g., bottom hemisphere of the sphere-like shape of the cage). For example, all of the magnets may be disposed on the top portion of the cage. The "top" portion is on the upward side when the magnetic drone flies upward, and the "bottom" portion is on the downward side when the magnetic drone flies downward (toward the gravity). The example of the magnetic drone (100) shown in FIG. 1 includes magnets (106) toward the top hemisphere of the magnetic drone (100). In one or more embodiments, the magnetic drone may include 5 magnets, and the 5 magnets may be disposed on the equator and top portion of the cage. The equator may refer to the area of the cage that surrounds the drone in the horizontal plane. In this example, one (1) magnet (106) may be disposed at the topmost part of the top portion of the cage (104), as shown in FIGS. 1, and 4 magnets (106) may be disposed on the equator of the cage (104). The 4 magnets (106) may be disposed in equal distance from one another on the equator of the cage (104). In other words, on the equator of the cage, 2 of the 4 magnets (106) may be disposed as shown in FIG. 1, and the other 2 of the 4 magnets (106) may be disposed offset by 90 degrees from the initial 2 of the 4 magnets (106) on the equator of the cage (104).

According to one or more embodiments, the electric motors of the drone that rotate the propellers are electrically connected to the battery, and a controller (e.g., a remote controller) can turn ON (i.e., rotate) and OFF (i.e., stop the rotation of) the propellers. Initially, the controller turns ON the propellers so that an operator can fly the magnetic drone to a desired place close to a ferrous/metallic surface of an asset. Then, because of the magnets surrounding the drone, the magnetic drone attaches to the ferrous surface of the asset. For example, the drone operator can fly the magnetic drone to a desired place where one of the magnets touches a ferrous surface in the desired place. Because the magnetic force between the magnet and the ferrous surface can hold the magnetic drone's weight laterally or vertically. Then, the operator can turn OFF the propellers of the drone, to save battery power. During this time, the camera can take pictures and videos for inspection or surveillance. The saved battery power can be used for extending the inspection time. Accordingly, the inspection time, before returning the drone to the base, can be improved. In one or more embodiments, the camera on the drone may be fitted with a fisheye lens that has a wider angle view between 100 and 180 degrees.

According to one or more embodiments, one or more of the magnets are strong enough to hold the magnetic drone hanging from the ferrous surface. For example, the magnetic force of each of the magnets is high enough such that when the magnet is in contact with the ferrous surface, the magnet can hold the weight of the magnetic drone. In one example, the magnetic force of the magnet may be higher than the weight of the magnetic drone.

According to one or more embodiments, the magnets are not too strong so that the drone can detach itself from the ferrous surface. In other words, the magnetic force of the magnet is low enough such that when the magnet is in contact with the ferrous surface, the drone can generate enough force against the ferrous surface to separate the magnet from the ferrous surface. For example, the magnetic force of the magnet may be less than the sum of the weight of the magnetic drone and the maximum force the propellers of the magnetic drone can generate against the ferrous surface. An example of the magnetic force of the magnet is shown further below under the section titled Configuration of the magnetic drone.

In addition, according to one or more embodiments, the magnetic force between the magnet and the ferrous surface can provide support for the camera of the magnetic drone to take more stable pictures and videos. Accordingly, inspection quality can be improved.

Figure 2:
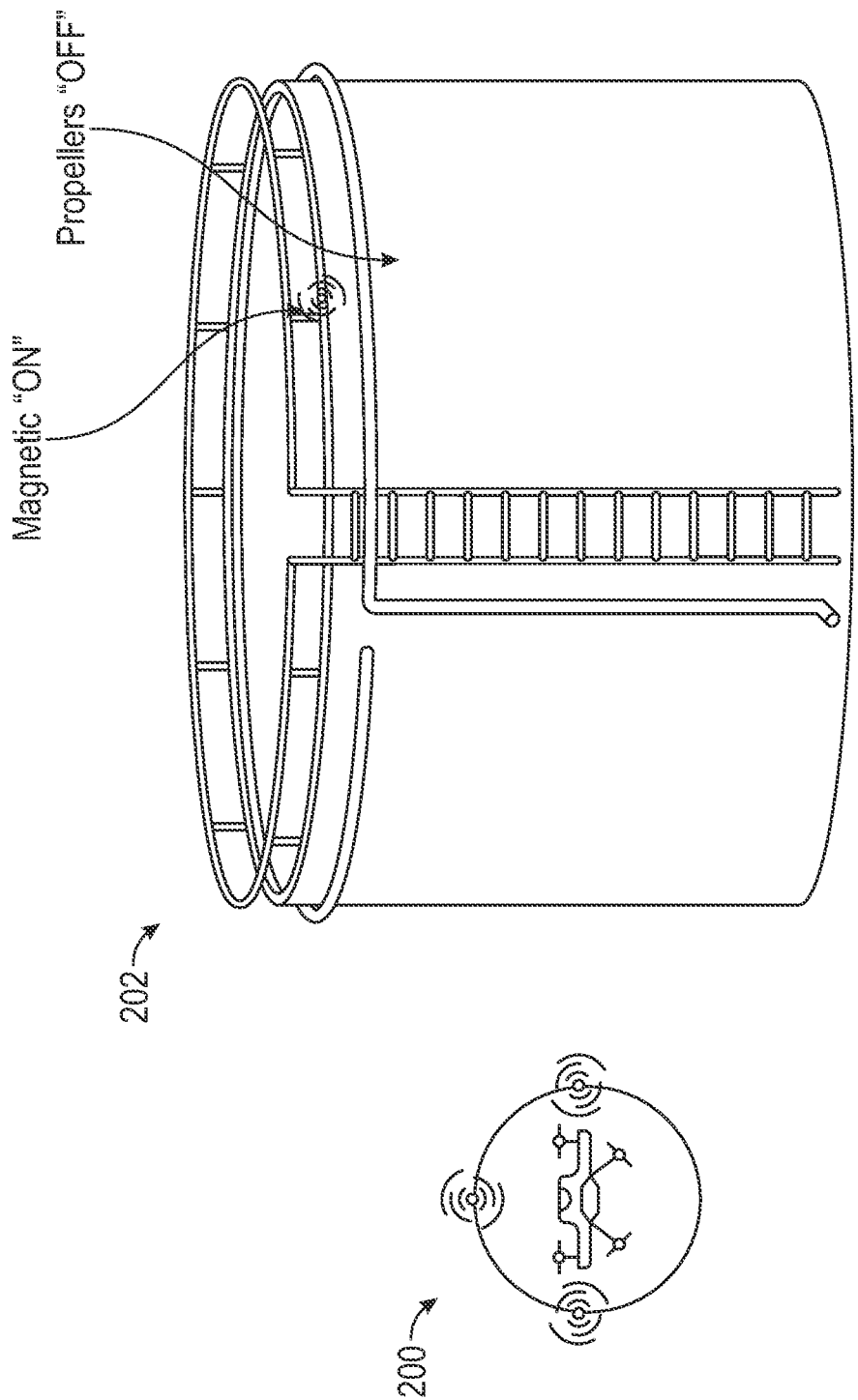
FIG. 2 shows operation of a magnetic drone in accordance with one or more embodiments disclosed herein.

An example of the operation of the magnetic drone is shown in FIG. 2. Specifically, the magnetic drone (200) flies, using the force created by rotation of the propellers, to a desired spot on the tank (202) for inspection. For this, an operator or a computer program may fly the magnetic drone (200). The computer program may be implemented in a computer that is described further below with reference to FIG. 6. The magnetic drone (200) flies above and then inside the tank (202) close to a target ferrous surface of an inner wall of the tank (202). When a magnet of the magnetic drone (200) contacts the ferrous surface of the inner wall of the tank (202), the magnet attaches to the ferrous surface and secures the magnetic drone (200) in place. Because the magnetic force between the magnet and the ferrous surface can hold the weight of the magnetic drone (200), the propellers can be turned OFF, by the operator or the computer program. Then, the camera on the magnetic drone (200) can take pictures and videos from inside of the tank (202). In FIG. 2, "Magnetic 'ON'" illustrates a surface to which the magnetic drone (200) can attach, and "Propellers 'OFF'" illustrates that inside the tank (202), when the magnetic drone (200) is attached to an inner surface of the tank (202), the operator or computer program can turn OFF the propellers of the magnetic drone (200) and start taking inspection pictures or videos.

Figure 3:
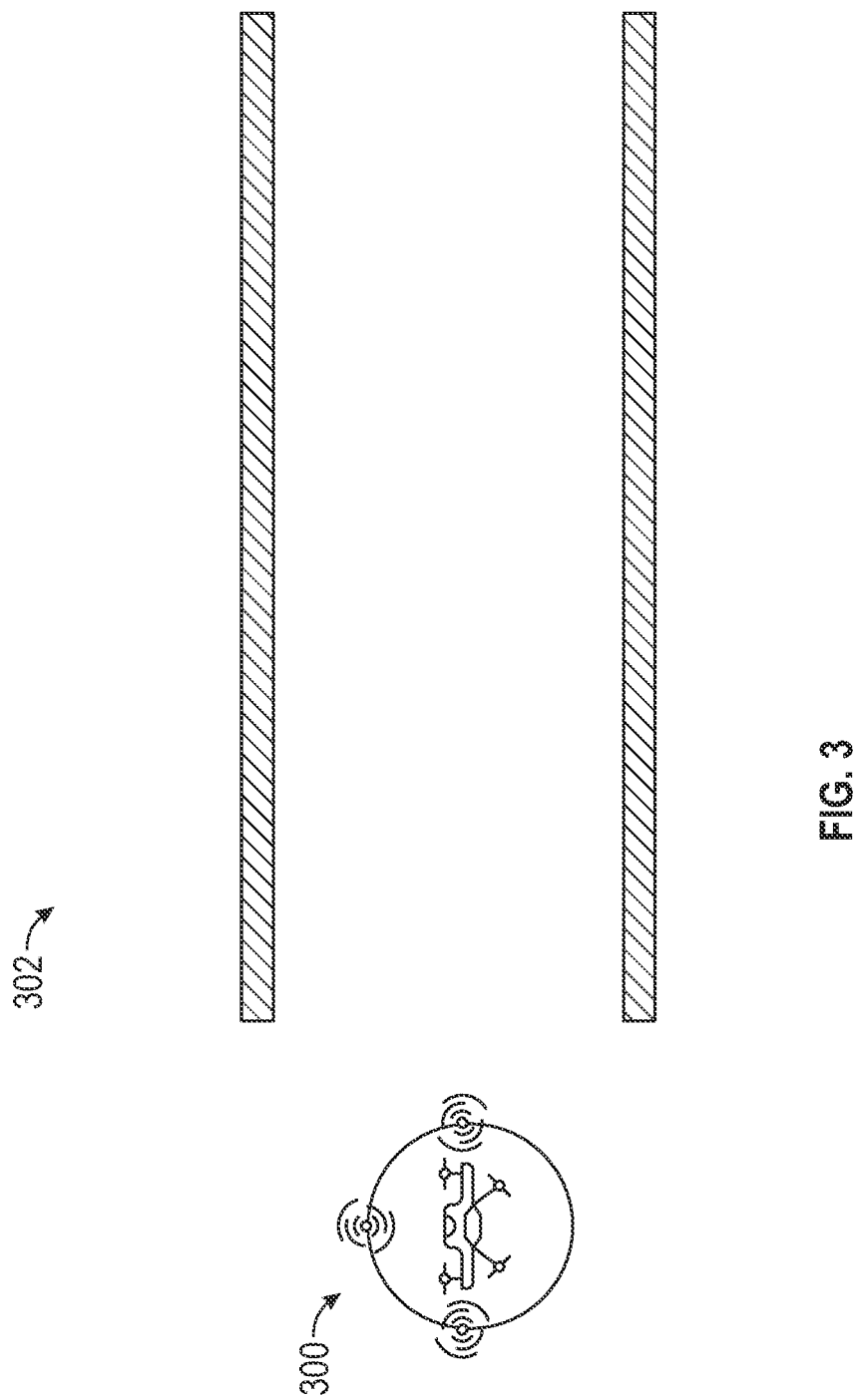
FIG. 3 shows operation of a magnetic drone in accordance with one or more embodiments disclosed herein.

Another example of the operation of the magnetic drone is shown in FIG. 3. Specifically, the magnetic drone (300) flies, using the force created by the propellers, to a desired spot in a pipeline (302) for inspection. The magnetic drone (300) flies inside the pipeline (302) close to a target ferrous surface of an inner wall of the pipeline. When a magnet of the magnetic drone (300) contacts the ferrous surface of the inner wall of the pipeline (302), the magnet secures the magnetic drone (300) in place. Then, the propellers of the magnetic drone can be turned OFF, by the operator or computer program, and the camera on the magnetic drone (300) can take pictures and videos from inside of the pipeline (302).

FIG. 4 shows a flowchart for a process of deploying and retracting the magnetic drone. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4. Steps 400 to 450 shown in FIG. 4 are explained below.

In Step 400, the operator or computer program turns ON the propellers of the magnetic drone to start deployment of the magnetic drone from the base to the target location. In Step 410, the operator or computer program flies the magnetic drone, using the propellers, to the target location that comprises a ferrous surface. In Step 420, a magnet of the magnetic drone contacts the ferrous surface of the target location, so that the magnetic drone securely attaches to the ferrous surface. For example, with respect to FIG. 2, the operator or computer program flies the magnetic drone (200) to the location that is annotated by "Magnetic 'ON'" in FIG. 2 that includes the ferrous surface to which the magnetic drone (200) can attach. The attaching may be such that the magnetic drone stays in place, via the magnetic force of the magnets, even with the propellers being OFF. In Step 430, when the magnetic drone is securely attached to the ferrous surface, the operator or computer program turns OFF the propellers. In Step 440, when the magnetic drone is securely attached to the ferrous surface, the operator or computer program captures images or videos via the camera of the magnetic drone. The magnetic drone may include a memory to store the images and videos, or may wirelessly communicate them to a memory on a remote computer. In Step 450, after the camera captures the images or videos, the operator or computer program turns ON the propellers of the magnetic drone to detach the magnetic drone from the ferrous surface of the target location, and flies the magnet drone back to the base.

According to one or more embodiments described further below, one or more of the magnets may be electromagnets. In this case, the method may include turning ON the electromagnet when the electromagnet is within a distance from the ferrous surface such that the a magnetic field of the electromagnet can attach the electromagnet to the ferrous surface. For example, the operator or computer program may turn ON the electromagnet before or after Step 420. Specifically, the operator or computer program may turn ON the electromagnet when the electromagnet hovers close to the ferrous surface such that the magnetic field of the electromagnet can attach the electromagnet to the ferrous surface. In another situation, the electromagnet may first contact the ferrous surface and then the operator or computer program, manually or automatically, may turn ON the electromagnet. The method may also include turning OFF the electromagnet to detach the electromagnet from the ferrous surface. For example, the operator or computer program may turn OFF the electromagnet concurrently with or after the time when the propellers of the magnetic drone are turned ON, to detach the magnetic drone from the ferrous surface, as described in Step 450.

According to one or more embodiments disclosed herein, an example configuration of the magnetic drone and an example of the magnetic drone's total weight are shown below:

Configuration of the Magnetic Drone:
  Weight of the cage drone (i.e., the drone with the cage around it)=1.4 kilogram (kg) (for the cage drone being Elios 2—Brochure);
  Type of the magnets: N52 magnets (CMS magnets), thickness of each magnet=1.53 millimeters (mm), weight of each magnet=13.33 grams (g), and pull force of each magnet can hold 4.5 kg; and
  5 magnets are used around the cage with the total weight of 66.65 g.
Weight of the Magnetic Drone:
  Total weight of the Magnetic drone=the weight of the cage drone that is 1.45 kg+the total weight of the 5 magnets that is 66.65 g=1.516 kg.

According to one or more embodiments, an example of the operation time of the magnetic drone is described herein. In this example, it is considered that the magnetic drone is the cage drone described in the previous example (Elios 2—Brochure including the 5 magnets) that can operate for about 10 minutes, without attaching to a magnetic surface. For this, it is considered that the battery capacity of the cage drone is 6000 milliampere/hour (mAh), the cage drone has 4 motor propellers, and the magnets are 5 of N52 type. In the 10 minutes flying time consideration, it is assumed that flying the cage drone takes 80% (8 minutes) and using the camera takes 20% (2 minutes) of the battery life.

However, when the magnetic drone attaches to a ferrous surface for inspection or surveillance, the battery life of the magnetic drone can be increased to well beyond 10 minutes, because the propellers can be turned OFF while the magnetic drone is attached to the ferrous surface. Specifically, the time of flying can be only about 2 minutes, assuming 1 minute is for flying the magnetic drone to the target location and 1 minute for returning the magnetic drone to the base (initial location). This will consume 20% (2 minutes) out of the 80% of the battery. The remaining 60%=6 minutes that was initially for flying the magnetic drone can now be spent on inspection or surveillance. In other words, about an extra 6 minutes of the battery life can be saved and used for inspection or surveillance. The time extension calculations are also described below.

Battery consumption time A: Battery consumption of the magnetic drone with propellers rotating all the time during operation of the magnetic drone=battery consumption of the camera for 2 minutes+battery consumption for the 4 propellers for 8 minutes=10 minutes.

Battery consumption time B: Battery consumption of the magnetic drone for when the magnetic drone can attach to a ferrous surface=battery consumption of the camera for 2 minutes+battery consumption for the 4 propellers to take the magnetic drone to the target place and to return it from the target place that is 2 minutes=4 minutes.

The different between Battery consumption time A and Battery consumption time B=10 minutes−4 minutes=6 minutes.

Therefore, the magnetic drone as described herein can save 6 extra minutes for inspection or surveillance.

Those skilled in the art will appreciate that the above examples configurations and numerical data for the magnetic drone are not meant to limit the scope of this disclosure. Any suitable dimensions of the design of the drone may be used without departing from the scope disclosed herein. According to one or more embodiments, some available technologies in the market that can be developed to add magnetic parts to cage drone such as Flyability, Skypersoinc companies drone, etc.

According to one or more embodiments, one or more of the magnets of the magnetic drone may be permanent magnets, for example N52. In some embodiments, all of the magnets may be permanent magnets.

In one or more embodiments, one or more of the magnets may be electromagnets that each includes a wire coil wrapped around a ferrous core. A battery of the magnetic drone may supply the electric current needed for inducing a magnetic field in the electromagnets. The operator or computer program may control the electric current of the electromagnets so as to control the magnetic properties of the electromagnets. For example, when the magnetic drone hovers on a ferrous surface of the target area, the operator or program may switch ON the electric current to induce the magnetic field, by the electric current passing through the coils, and then the magnetic drone attaches to the ferrous surface via at least one of the electromagnets. Then, the operator or computer program may turn OFF the propellers and start taking pictures or videos by the camera. When the magnetic drone is required to return to the base, the propellers can be turned ON and the electromagnets can be turned OFF so that the magnetic drone can detach from the ferrous surface. In some embodiments, the strength of the magnetic force of the electromagnets can be controlled/adjusted by controlling the amount of the electric current that passes the electromagnets. In one or more embodiments, all of the magnets of the magnetic drone may be electromagnets. In one or more embodiments, both of the electromagnets and permanent magnets may be used as the magnets of the magnetic drone.

In one or more embodiments, the electromagnets may be connected to the processor of the drone and to the battery of the drone via wires so that the processor can control the magnetic forces of the electromagnets. In other embodiments, a separate battery and/or a separate processor that are mounted on the magnetic drone may control the magnetic forces of the electromagnets.

Because of extending the surveillance time, the magnetic drone described in embodiments of the present disclosure can save significant operation costs. An example of the cost saving of the magnetic drone is shown in following Table 1, in accordance with one or more embodiments disclosed herein.

TABLE 1

| | | Cost avoidance Companywide | | | | |
|---|---|---|---|---|---|---|
| Equipment | Number of Equipment | Number of Manpower needed to operate Caged drone | Average inspection Time by using caged drone (hr) | Current Inspection Cost by using caged drone | Manhour Saved | 60% reduction by using Electromagnetic drone |
| Tank | 19015 | 2 | 2 | $2,697,168.78 | 45636 | $1,618,301.27 |
| Pressure Vessel | 28616 | 2 | 2 | $4,059,015.61 | 68678.4 | $2,435,409.36 |
| Column | 1719 | 2 | 4 | $487,660.60 | 8251.2 | $292,596.36 |
| Flare | 354 | 2 | 4 | $100,425.74 | 1699.2 | $60,255.45 |
| Total | 49704 | | | $7,344,270.73 | 124264.8 | $4,406,562.44 |

Figure 5:
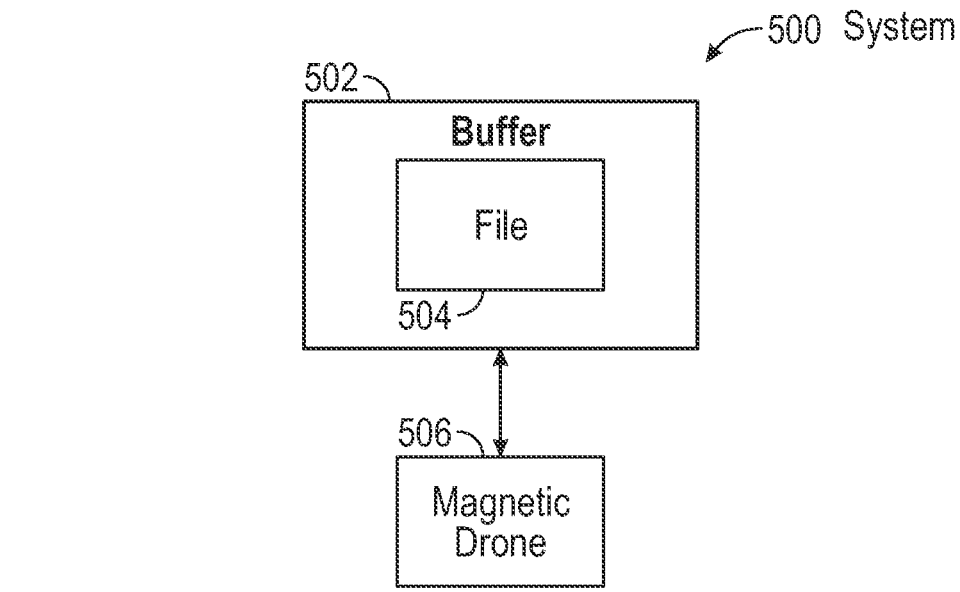
FIG. 5 shows a system for operating a magnetic drone in accordance with one or more embodiments disclosed herein.

FIG. 5 shows a system (500) including, for example, a buffer (502) and a magnetic drone (506), for example for performing inspection of oil and gas assets. Examples of the magnetic drone (506) are explained above with reference to FIG. 1, and examples of the oil and gas assets are explained above with reference to FIGS. 2 and 3. The buffer (502) may be located on a computer system (e.g., personal computer (PC), laptop, tablet PC, smart phone, kiosk, server, etc.) such as that shown and described in FIG. 6 below, or on different computer systems connected by a network of any size having wired and/or wireless segments. The buffer (502) may include instructions for operation of the magnetic drone (506) in a file (504). The buffer (502) is wirelessly connected to the magnetic drone (506) to perform the instructions. In one or more embodiments, the buffer (502) may be a part of the magnetic drone (506). The buffer (502) may be implemented in hardware (i.e., circuitry), software, or any combination thereof. The file (504) may include algorithm and data to perform the operations described above with respect to FIG. 4.

Further, one or more embodiments disclosed herein for operating the magnetic drone, for example with reference to FIG. 4, may be implemented on virtually any type of computer system, regardless of the platform being used. For example, the computer system may be one or more mobile devices (e.g., laptop computer, smart phone, personal digital assistant, tablet computer, or other mobile device), desktop computers, servers, blades in a server chassis, or any other type of computer system that includes at least the minimum processing power, memory, and input and output device(s) to perform one or more embodiments of the invention.

Figure 6:
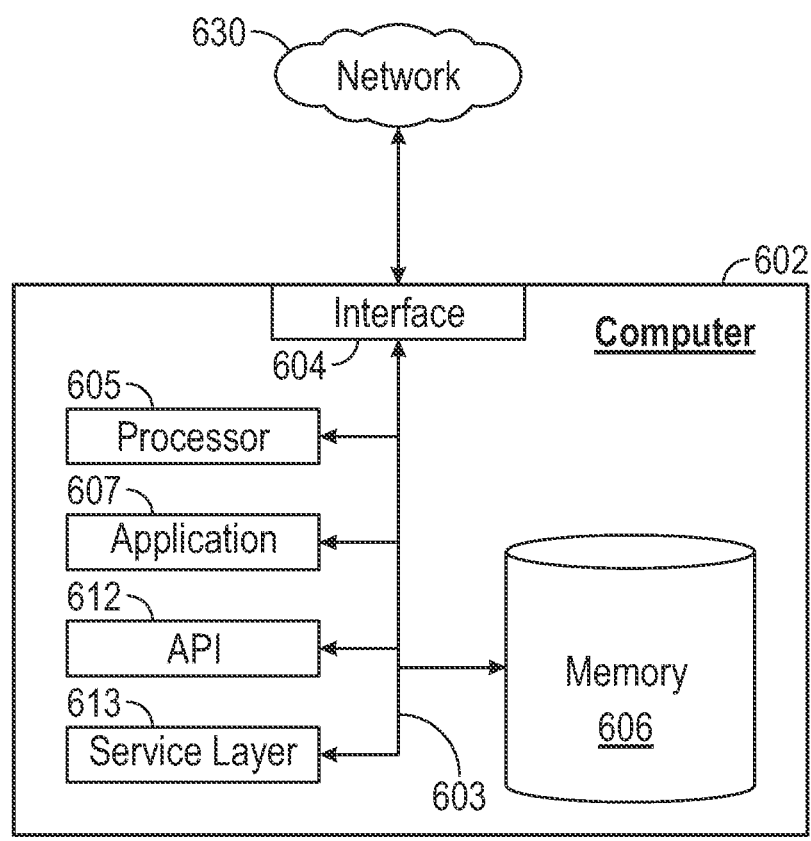
FIG. 6 shows a computer system for operating a magnetic drone in accordance with one or more embodiments disclosed herein.

An example of the computer system is described with reference to FIG. 6, in accordance with one or more embodiments. FIG. 6 is a block diagram of a computer system used to provide computational functionalities associated with described algorithms, methods, functions, processes, flows, and procedures as described in the instant disclosure, according to an implementation. The illustrated computer (602) in the computer system is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613)). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer (613). Software services, such as those provided by the service layer (613), provide reusable, defined business functionalities through a defined interface. For example, the interface may be software written in JAVA, C++, Python, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602). In one example, the method described with reference to FIG. 4 may be implemented by the application (607).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602). Furthermore, in one or more embodiments, the computer (602) is a non-transitory computer readable medium (CRM).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A magnetic drone comprising:
   a drone comprising:
      a camera;
      a battery;
      one or more electric motors; and
      one or more propellers;
   a cage surrounding the drone; and
   one or more magnets disposed on the cage surrounding the drone,
   wherein the one or more magnets are disposed on an outer surface of the cage such that the one or more magnets magnetically attach to a ferrous surface outside of the cage to secure the magnetic drone to the ferrous surface,
   wherein at least one of the one or more magnets is disposed on an equator of the cage,
   wherein the one or more magnets are disposed such that more of the one or more magnets are disposed on a top hemisphere of the cage than on a bottom hemisphere of the cage, and
   wherein the top hemisphere of the cage is on an upward side of the cage when the magnetic drone flies upward, and the bottom hemisphere of the cage is on a downward side when the magnetic drone flies downward.

2. The magnetic drone of claim 1, wherein the one or more magnets are permanent magnets.

3. The magnetic drone of claim 1, wherein the one or more magnets are N52 type.

4. The magnetic drone of claim 1,
   wherein a magnetic force of each of the one or more magnets is higher than a weight of the magnetic drone, and
   wherein the magnetic force of the each of the one or more magnets is lower than sum of the weight of the magnetic drone and a maximum force that the propellers of the magnetic drone can generate against the ferrous surface.

5. The magnetic drone of claim 1, wherein the one or more magnets are electromagnets that are controlled by a processor of the magnetic drone, to be switched ON and OFF.

6. The magnetic drone of claim 5, wherein the battery of the magnetic drone supplies the one or more electromagnets to be switched ON and OFF via the processor.

7. The magnetic drone of claim 1, wherein the one or more magnets comprises five magnets.

8. The magnetic drone of claim 7, wherein one of the five magnets is disposed at a topmost part of the cage.

9. The magnetic drone of claim 8, wherein the other four magnets of the five magnets are disposed on the equator of the cage such that a pair of magnets among the four magnets is disposed, on the equator, offset by 90 degrees from the other pair of magnets among the four magnets.

* * * * *